3,024,284
PROCESS FOR THE PREPARATION OF SIMPLE KETALS

William L. Howard and Nicholas B. Lorette, Lake Jackson, Tex., assignors to The Dow Chemical Company, Midland, Mich., a corporation of Delaware
No Drawing. Filed Apr. 25, 1961, Ser. No. 105,259
2 Claims. (Cl. 260—611)

The present invention relates to a new and useful method for preparing ketals and is more particularly concerned with a new and useful method for preparing ketals having the generic formula

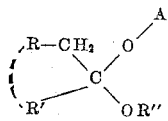

wherein R represents a member selected from the group consisting of hydrogen and a lower alkyl radical having from 1 to 5 carbon atoms, inclusive, and which may be joined together in the manner of the dotted line with R' to form a cycloalkyl ring; R' represents a lower aliphatic radical having from 1 to 5 carbon atoms, inclusive; R" represents a lower alkyl radical having from 1 to 6 carbon atoms or a cyclohexyl radical; and, A represents a secondary alkyl or alkenyl radical containing from 3 to 8 carbon atoms or a cycloalkyl or alkenyl radical containing 4 to 6 carbon atoms.

The process of the present invention comprises reacting by mixing in the presence of an acid catalyst a lower secondary alcohol having the formula

AOH wherein A has the aforesaid significance, with an alpha-unsaturated ether having the formula

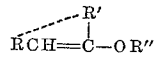

wherein R, R' and R" have the aforesaid significance. The reaction is somewhat exothermic and proceeds readily at temperatures from about −10° to about 100° C. and preferably, so as to prevent the polymerization of the unsaturated ether, from about 0° to about 20° C. The temperature can be maintained below about 20° C. by external cooling of the reaction mixture and/or the portionwise addition of the ether or the alcohol. Good results are obtained when the reactants are employed in substantially equimolecular proportions, and preferably when the alcohol is employed in slight excess. The reaction mixture is then made alkaline and washed with water to obtain the appropriate ketal. The products can be further purified by fractional distillation, solvent extraction, or other conventional means. A large excess of secondary alcohol will react with the unsymmetrical ketal which has formed to yield the symmetrical di-sec.-alkyl ketal, or two symmetrical ketals can be formed by disproportionation of the unsymmetrical ketal.

Substantially any lower aliphatic secondary alcohol having the generic formula AOH in which A has the significance hereinbefore stated, can be employed. Thus, one can employ the lower secondary alcohols such as isopropyl alcohol, sec.-butyl alcohol, 2-pentanol, 3-pentanol, 2-hexanol, 3-hexanol, methyl isobutyl carbinol, cyclopentanol, cyclohexanol, the heptanols, octanols and the like; also the lower secondary alkenols such as 3-buten-2-ol, 3-penten-2-ol, 4-methyl-3-penten-2-ol, 3-ethyl-3-buten-2-ol, the heptenols, octenols and cyclopentenols and cyclooctenols.

Likewise substantially any alpha-unsaturated ether having the generic formula

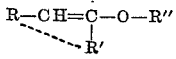

wherein R, R' and R" have the significance hereinbefore stated, can be employed in accordance with the present invention. Thus one can employ isopropenyl methyl ether, isopropenyl ethyl ether, isopropenyl propyl ether, isopropenyl isopropyl ether, isopropenyl butyl ether, isopropenyl isobutyl ether, isopropenyl pentyl ether, isopropenyl isopentyl ether, isopropenyl hexyl ether, any of the lower alkyl 1-buten-2-yl, 2-buten-2-yl, 1-penten-2-yl, 2-penten-2-yl, 2-penten-3-yl, 5-dodecen-5-yl or 1-cyclohexenyl ethers, or the like, such as isopropenyl isohexyl ether, isopropenyl cyclohexyl ether, 1-cyclohexenyl methyl ether, isobutenyl methyl ether, isopentenyl ethyl ether and the like.

Substantially any acid condensation catalyst can be employed to catalyze the reaction. Thus one can employ the organic acids such as para toluenesulfonic acid, the inorganic acids such as sulfuric, hydrochloric, boron trifluoride as well as the sulfonic acid ion exchange resins, and the like.

The following example illustrates the present invention but is not to be construed as limiting:

EXAMPLE I

*Addition of Isopropyl Alcohol to Isopropenyl Methyl Ether*

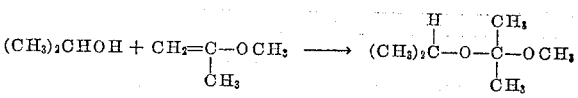

With external cooling to keep the temperature of the reaction solution below 20°, 60 g. of isopropenyl methyl ether (0.83 mole) was added dropwise with stirring to 120 g. of isopropyl alcohol (2.0 moles) containing 0.035 g. of p-toluene-sulfonic acid. The addition required about 30 minutes, after which the solution was immediately made alkaline with a 3-fold excess of sodium methylate. The reaction product was washed in portions with 600 ml. of water, and the aqueous phase was extracted with 100 ml. of 45–60° petroleum ether which was then washed with water and combined with the main product. The organic solution was dried with potassium carbonate.

Fractional distillation gave 46.5 g. of material of B.P. 45°/59 mm., $n_D^{25}$ 1.3876; acetone isopropyl methyl acetal, yield 42 percent; 21 g. of residue with $n_D^{25}$ 1.3977: acetone diisopropyl acetal, yield 16 percent; and other intermediate fractions having refractive indices and boiling points indicating them to be mixtures of these ketals and acetone dimethyl acetal (these amounted to about 30 g. and were not further worked up).

EXAMPLE II

*Addition of Secondary Alcohol to α,β-Unsaturated Ether to Produce Mixed Prim-alkyl Sec-alkyl Ketals*

A small quantity (about 0.10 g./100 ml.) of p-toluenesulfonic acid was dissolved in each of the several secondary alcohols shown in Table 1 and an appropriate amount of each acidified alcohol was weighed into reaction vessels and 5.00 ml. of carbon disulfide was added to each. An appropriate weight of the unsaturated ether was then added. The contents of each vessel was then mixed by shaking, and in each instance heat was given off, a typical characteristic of the addition of alcohols to a α,β-unsaturated ether to form ketals. Each reaction mixture was then diluted to 10.0 ml. with carbon disulfide.

Infrared analysis of the product solutions showed in every case the almost complete disappearance of absorption due to the double bond in the ethers, and absorption bands typical of ketals were present in the wavelength region of 9 to 10 microns. Absorption due to the hydroxyl groups of the alcohols was reduced in every case and was almost absent in those cases where nearly equimolar amounts of alcohol and ether were used. These data show that the reactions were nearly quantitative in forming ketals.

TABLE 1

$$AOH + CH_2=C-O-R'' \longrightarrow CH_3-C\begin{smallmatrix}OA\\|\\CH_3\end{smallmatrix}OR''$$

| A | R'' | G. moles ether | G. moles alcohol |
|---|---|---|---|
| 2-butyl | Methyl | 0.014 | 0.023 |
| 2-pentyl | do | 0.014 | 0.017 |
| Cyclohexyl | do | 0.014 | 0.015 |
| 2-pentyl | Ethyl | 0.012 | 0.011 |
| Cyclohexyl | do | 0.012 | 0.010 |
| Isopropyl | Propyl | 0.010 | 0.017 |
| 2-butyl | do | 0.010 | 0.014 |
| Cyclohexyl | do | 0.010 | 0.011 |

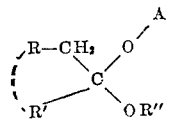

| A | R' | Gm. moles ether | Gm. moles alcohol |
|---|---|---|---|
| Isopropyl | Methyl | 0.0089 | 0.017 |
| 2-butyl | do | 0.0089 | 0.014 |
| Cyclohexyl | do | 0.0089 | 0.010 |
| Isopropyl | Ethyl | 0.0079 | 0.017 |
| 2-pentyl | do | 0.0079 | 0.011 |

EXAMPLE III

Other acids may be utilized in the reaction of the present invention, although para toluenesulfonic acid is preferred because it is non-volatile and readily soluble in the reaction mixture. Various acid catalysts were used with mixtures of alpha-unsaturated ethers and alcohols made up in an inert solvent. Infra red spectra were made both before and after the addition of the acid catalyst. The spectra taken before the acid addition showed the distinguishing absorption bands due to the unsaturation of the ether, while those taken afterward showed the diminution or complete disappearance of these bands and the appearance of bands characteristic of ketals. The following table shows the reactants and catalysts used and the products formed. The proportion of alcohol used was slightly in excess of the stoichiometric amount required. The catalysts were used in amounts of approximately 100 to 500 parts per million by weight of reaction mixture.

TABLE 2

| | Alcohol | Alpha-unsaturated ether | Catalyst | Ketal Product |
|---|---|---|---|---|
| A | Isopropyl | Isopropenyl methyl | PTSA [1] | Acetone isopropyl methyl. |
| | do | do | HCl | do. |
| | do | do | H$_2$SO$_4$ | do. |
| B | Cyclohexyl | do | PTSA | Acetone cyclohexyl methyl. |
| | do | do | BF$_3$ | do. |
| | do | do | Cl$_3$CCOOH | do. |
| C | Isopropyl | Cyclohexenyl methyl | PTSA | Cyclohexanone isopropyl methyl. |
| | do | do | H$_2$SO$_4$ | do. |
| | do | do | H$_3$PO$_4$ | do. |
| | Cyclohexyl | do | H$_2$SO$_4$ | Cyclohexanone cyclohexyl methyl. |
| D | sec-Butyl | Isopropenyl propyl | PTSA | Acetone propyl sec-butyl. |
| | do | do | Cl$_3$CCOOH | do. |
| | do | do | BF$_3$ | do. |

[1] PTSA—para-toluenesulfonic acid.

EXAMPLE IV

Both isopropyl and secondary butyl alcohol were reacted with isopropenyl methyl ether at temperatures of 0° and —20° C. One reaction mixture contained three molar proportions of isopropyl alcohol to one of the ether and the other contained four molar proportions of sec-butyl alcohol to one of the ether. A portion of each reaction mixture was set aside for use as a blank while the remainder was divided into two parts and cooled to the respective temperatures at which the reaction was to be run. To the blank a small quantity of triethylamine was added to prevent any reaction from adventitious traces of acid. To the reaction mixtures, previously cooled, para-toluenesulfonic acid was added as a catalyst. The reaction mixtures were maintained at their respective temperatures for two hours after which they were neutralized at the reaction temperature with triethylamine and brought to room temperature. Comparison of their infrared spectra with that of the blanks showed the disappearance of the absorption bands due to the ether, a diminution of those due to the alcohols, and the appearance of bands due to the ketal structures.

This application is a continuation-in-part of application Serial No. 796,290, filed March 2, 1959, and now abandoned.

The claims:

1. A method for the preparation of ketals having the generic formula

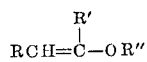

wherein R represents a member selected from the group consisting of hydrogen and lower alkyl radicals having from 1 to 5 carbon atoms; R' represents an alkyl radical having from 1 to 5 carbon atoms, inclusive, and R and R' can be joined together to form a cyclic ring containing from 4 to 6 carbon atoms; R'' represents a member selected from the group consisting of alkyl radicals having from 1 to 6 carbon atoms, inclusive, and cyclopentyl and cyclohexyl radicals; and A represents the hydrocarbon residue of a secondary alcohol selected from the group consisting of secondary aliphatic alcohols having from 3 to 8 carbon atoms and cycloaliphatic alcohols having from 4 to 6 carbon atoms which comprises: reacting a lower secondary alcohol having the formula

AOH wherein A has the above significance, with an alpha-unsaturated lower ether having the formula $$RCH=\overset{R'}{\underset{|}{C}}-OR''$$

wherein R, R' and R'' each have the aforesaid significance in the presence of an acid catalyst and at a temperature of from about —10° to 100° C.

2. The process of claim 1 wherein the temperature of reaction is maintained at from about 0° to about 20° C.

No references cited.